July 2, 1940.  E. U. T. BERTHELSEN  2,206,831
GEAR AND METHOD OF MAKING
Filed March 7, 1938
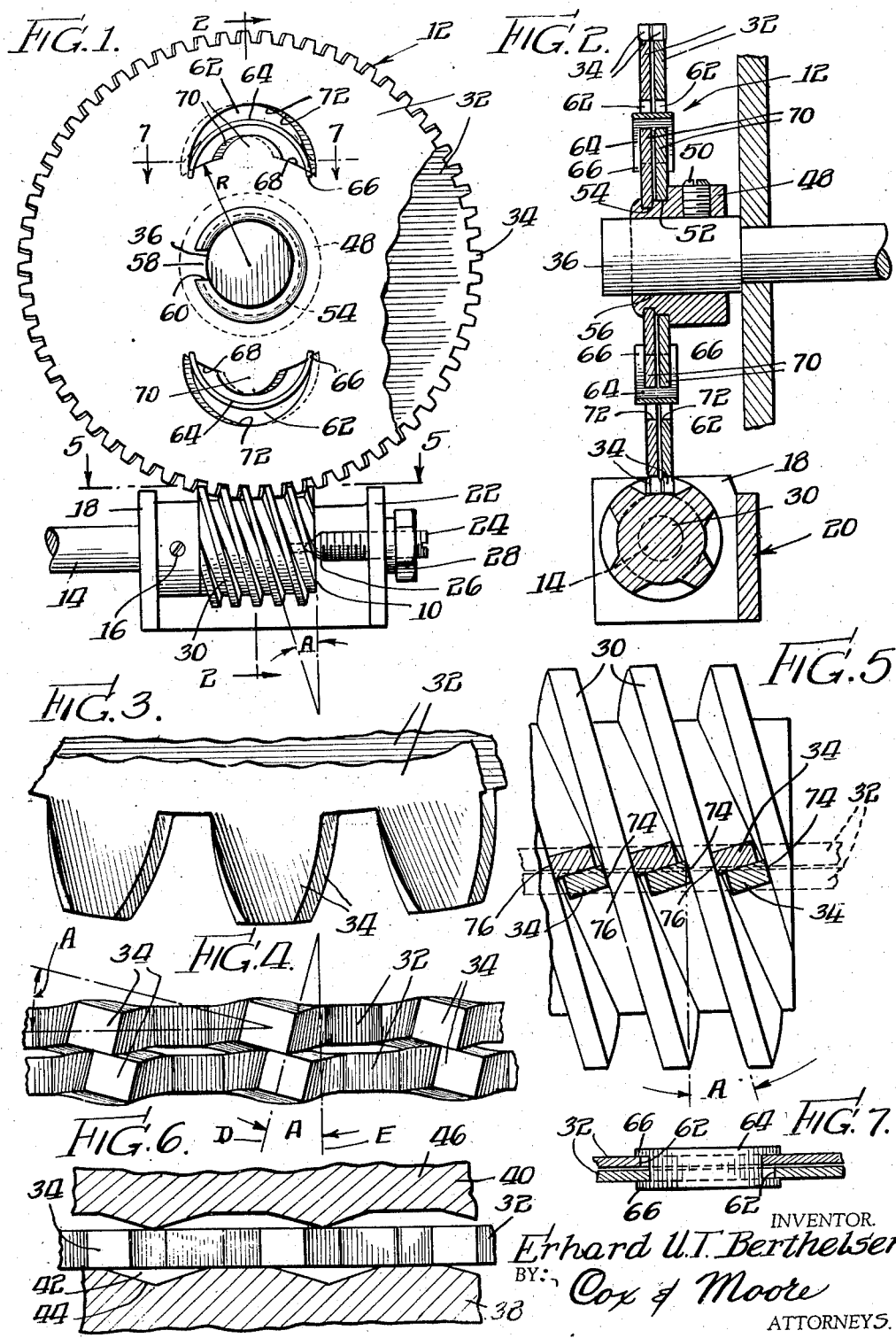
INVENTOR.
Erhard U. T. Berthelsen
BY: Cox & Moore
ATTORNEYS.

Patented July 2, 1940

2,206,831

UNITED STATES PATENT OFFICE 2,206,831

GEAR AND METHOD OF MAKING

Erhard U. T. Berthelsen, Chicago, Ill., assignor to Illinois Tool Works, Chicago, Ill., a corporation of Illinois Application March 7, 1938, Serial No. 194,256

14 Claims. (Cl. 74—440)

The present invention relates to gearing, and more particularly to gears for use in gearing, comprising helical or worm gears.

Gears used in intermeshing engagement with helical or worm gears must, in order to properly intermesh with the helical tooth on the helical or worm gear, be provided with teeth extending in lines angularly arranged with respect to the axis of the gear. So, also, gears of this type are often provided with a curved throat when machined from a relatively thick blank. The production of gears having teeth so configurated has heretofore necessitated the forming of the tooth portions by relatively slow and costly machining operations such, for example, as by generating the teeth by the hobbing process.

It is an object of the present invention to provide an improved and simplified gear of the above class, as well as a method for forming the gear which obviates the above difficulties and permits the manufacture of the gears by simple, expeditious and inexpensive forming operations.

The invention more specifically contemplates the provision of a method for forming a gear of the above type by a stamping or pressing operation which not only configurates the gear and shapes the teeth to the proper sectional form, but in addition twists the teeth bodily with respect to the plane of the gear so as to permit operative intermeshing with the mating helical gear.

Yet other objects of the present invention are to provide the novel and improved gear resulting from the above method, and in addition to provide a gear adapted for use in combination with helical gearing which eliminates backlash.

Numerous other objects and advantages will be more apparent from the following detailed description when considered in connection with the accompanying drawing, wherein—

Fig. 1 is an elevational view of a device embodying the principles of the present invention;

Fig. 2 is a sectional elevation taken on the line 2—2 in Fig. 1;

Fig. 3 is a detail elevational view of the lower portion of the worm wheel in Fig. 1 and showing the teeth configuration more in detail;

Fig. 4 is a plan view taken on the line 4—4 in Fig. 3;

Fig. 5 is a detail sectional plan view taken on the line 5—5 in Fig. 1;

Fig. 6 is a sectional detail view indicating the method of configurating the gear teeth, and showing a portion of suitable die members in operative position prior to shaping the teeth; and Fig. 7 is a sectional plan view taken on the line 7—7 in Fig. 1.

Referring to Figs. 1 to 5 of the drawing, wherein there is disclosed more in detail one preferred embodiment constructed in accordance with the present invention, it will be seen there is disclosed a set of operatively intermeshing gears, comprising the worm gear 10 and the worm follower indicated generally by the numeral 12. The worm gear 10 constitutes the driving member and is mounted upon the driving shaft 14 through the agency of a set screw 16, the shaft being rotatably journaled in a bearing aperture in the flange 18 of the bracket member indicated generally by the reference numeral 20.

The bracket member is provided with a second flange 22, generally parallel and coextensive with the flange 18. The flange 22 threadedly mounts the adjustable threaded pintle 24 in coaxial alinement with the shaft 14, the pintle having a tapered end 26 adapted to center and rotatably support the adjacent end of the worm gear, as clearly shown in Fig. 1. A suitable jam nut 28 permits the pintle to be locked in adjusted position so that the worm will be constrained for rotation about a fixed predetermined axis.

Attention is specifically directed to the fact that the worm gear 10, being a form of helical gear, has threads which at any point make a definite angle with a plane normal to the axis of the gear. This angle is generally known as the helix angle and is indicated by the letter A in Fig. 2. As is well-known to those skilled in the art, the helix angle is the angle made by the thread at its pitch diameter and it therefore substantially corresponds with the angle made by the flank of the tooth at a corresponding radial position. As is further well-known and illustrated in detail in Figs. 1 and 5 of the present drawing, the angle made by the flank surfaces of the helical worm tooth with a plane normal to the axis of the worm varies radially between the root and the crest of the tooth.

A worm wheel, to properly intermesh with the tooth or the teeth of the worm 12, must have peripheral tooth portions which extend in the same direction as the intermeshing tooth portions of the worm. In other words, the teeth 30 on the worm gear 10, can only be properly engaged when the worm wheel is provided with teeth having flanks which lie in parallel juxtaposition with the flanks of the teeth 30 at all points of intermeshing engagement. Accordingly, therefore, the worm wheel 12, as clearly shown in the figures, comprises a pair of parallel gear members 32 which have teeth inclined with respect to their plane. It will be noted that the gears are both identical in peripheral construction and configuration, each being of the same diameter, pitch, and tooth configuration, so that they may be said to be congruent in form, and when positioned in superposed relationship, as shown in Fig. 4, will coincide at all points of the working surfaces.

Attention is more specifically directed to the fact that each of the gears 32 is formed of flat sheet material and resides generally in a flat plane, as clearly shown in Fig. 2. The relative position of the flat body of the gear with respect to the tooth portions thereof is further indicated by the dotted lines 32 in Fig. 5. The gear teeth 34 on the periphery of the gears 32 have a cross-sectional form corresponding to that of conventional gear teeth, and extend generally transversely of the thickness of the sheet of material forming the gears. Attention is particularly directed to the fact, however, that each of the gear teeth 34 is twisted, displaced or warped bodily out of the plane of the gear. Thus, in Fig. 4 the line B represents the central plane of the upper gear 32, as viewed in the figure, while the line C represents a plane passing through the gear tooth normally thereto and midway between the extremities thereof at the pitch circle. Accordingly, it will be noted that the planes B and C intersect at the angle A, which is identical with the aforementioned angle A of the worm. The foregoing more or less diagrammatically illustrates the manner in which the tooth flanks are twisted so that they contact the worm tooth in conjugate alignment.

In view of the fact that the side faces or flanks of the teeth 34 extend normally with respect to the plane C at any selected section of the gear tooth, as indicated by the line D, these faces also form the angle A with the axis of the gear, which may be represented by the line E in Fig. 4.

The gears 32 are mounted upon the rotatable shaft 36 for rotation therewith. In the embodiment shown, it will be evident that the axis of the shaft 36 is parallel with any plane normal to the axis of the worm 10. Accordingly, the teeth 34 and the flanks or working surfaces thereof necessarily extend in the same direction as the teeth 30 when they are in intermeshing engagement, as shown in Fig. 1, and in such position the juxtaposed working surfaces will likewise be in parallel engagement. (See Fig. 5.)

It is particularly important to note that the twisting of the tooth with respect to the plane of the gear 32 is progressive, beginning adjacent the root portion of each tooth. That is to say, each of the teeth is warped so that the angle "A" made by its flank increases with the distance from the central axis of the gear. This is clearly shown in Fig. 4 wherein it will be noted that beginning with the root portion of the centermost tooth the flank surfaces have a correspondingly increased inclination as they progress toward the peripheral extremity of the gear tooth. This construction is also clearly evident in Fig. 3.

It will be understood from the foregoing that the present warping or progressive twisting of the gear teeth permits the teeth to properly interengage with a worm gear having teeth of true helical form. Thus it will be understood that merely bodily twisting the gear teeth the same angle throughout their radial extent cannot possibly suffice to correlate their contact surfaces with those of a worm gear having true helical gear teeth surfaces since such helical surfaces in a worm gear differ in angle at the top and bottom of the teeth.

To properly match these teeth for arrangement in conjugate alignment in the final gear train, therefore, the angle A must vary from the root to the end of the tooth, and the present invention provides a very simple and effective means whereby this may be accomplished by warping the transversely extending teeth into proper conformation with the mating tooth surfaces.

The gears 32 lend themselves readily to manufacture by means of a punch press. When proceeding in accordance with the preferred method, each of the gears may be pressed or stamped through the agency of such a press, using a pair of dies having appropriate cutting surfaces to sever the periphery of the blank in the form of the gear teeth disclosed and in addition, if desired, in the same operation to make the apertures in the plate, to be hereinafter described more in detail. It is thought that the nature of such a die will be obvious to anyone skilled in the art. As a second step in the process, the gear blanks so formed are placed in a second die, more or less diagrammatically disclosed in Fig. 6, wherein the numeral 38 indicates a portion of the lower die, and 40 a corresponding portion of the upper die, which will be suitably supported and actuated by a press (not shown). The lower die is provided with a series of V-shaped depressions 42, coextensive with each of the teeth 34 of the gear blank 32, and having a surface inclined at the angle A with respect to the flat surface of the die. The upper die 40 is provided with projections which correspond to and mate with the depressions 42.

In carrying out this method the gear blank will be situated so that the teeth 34 reside directly above the surfaces 44. Accordingly, when the upper die is actuated downwardly under pressure, each of the teeth will be bodily twisted through the predetermined angle A to produce the final gears, the dies 38 and 40 being preferably so configurated as to unaffect the remainder of the blank.

While this process involves two separate operations, it will be obvious from the above disclosure that these may be combined so that the operation of twisting the teeth, as well as the blanking of the gear teeth, will be carried out coincidentally through the agency of a single combination progressive die.

The gears 32 are mounted upon the shaft 36 through the agency of the bushing 48 positioned by a set screw 50. The right-hand gear 32, as viewed in Fig. 2, is rotatably mounted upon an annular shoulder 52. The left-hand gear 32, as viewed in the figure, has a relatively smaller central aperture engaging the annular portion 54 of reduced diameter, and the end 56 of the bushing is headed over or upset to rigidly mount this latter gear in the position shown. A tongue or lug 58 projects inwardly from the periphery of the central aperture 54 to the periphery of the shaft 36 through a suitable mating slot 60 extending radially of the bushing. As a result, the fixed gear is effectively positioned against inadvertent rotation with respect to the bushing 48 at any time.

In order to take up and prevent backlash in the gear train, each of the gears 32 is further provided with a pair of apertures 62 shown clearly in Fig. 1. It will be noted that the apertures on the adjacent gears 32 are identical in shape, form and position and are provided for supporting and positioning the sheet spring member 64. It is to be noted that the spring member 64 is made out of a flat strip of spring stock having a pair of spaced fingers 66 at either end forming bifurcations adapted to engage along opposite sides of the gears 32 to retain the spring 64 in the operative position shown clearly in Figs. 1, 2 and 7. From a consideration of the topmost apertures 62, shown in Fig. 1, it will be apparent that the lower edges thereof comprise portions 68 which are coincidental with a circle having a radius R whose center is the axis of the gears 32. The upper edges 72 of the aforementioned apertures 62 reside in a circular curve which intersects the curve of the edges 68 in two places.

As shown in the drawing, the ends of the bowed springs 64 bear oppositely against the edges 72 at substantially the points where they intersect with the lower edges 68 so that, when the gears 32 are relatively displaced with respect to each other, the springs will exert an equal and opposite force upon both of the gears, tending to return them to the position where the apertures 62 are in congruence.

During any relative movement of the gears, the bifurcated ends of the springs 64 will slide with respect to a portion of the edges 68 of each of the apertures 62. Attention is respectfully drawn to the fact, however, that in view of the location of the edges 68 in a line having a center coincident with the axis of the gears, any frictional resistance to rotation will be identically the same in both directions.

The lower edge of the apertures 62 is further provided with a central, inwardly extending tongue or lip 70 preferably having an edge parallel to the aforementioned curved edge 72. One important function of this tongue portion 70 is to prevent damage to the springs 64 by too great a relative shifting of the gears 32. In other words, these gears can never be rotationally shifted greater than a distance quivalent to the unbroken length of each of the segmental edge portions 68. To state the same function in other words, the ends of the springs 64 may be moved together only until they contact the tongue portion 70 at which point they will be effectively stopped.

According to the preferred form of the present invention the springs 64 are made of spring tempered flat spring steel and are assembled as shown by alining the respective apertures 62 and inserting the springs into position after they are bent to substantially conform with the curve of the edge 72. The springs 64 are, accordingly, due to the configuration of the apertures, retained always in the bowed position shown so that they exert opposite expansive stresses upon the gears.

In order to employ this structure to prevent backlash in the gear train, the gears, before being intermeshed with the worm 10, are relatively rotated a short distance from the normal position wherein the adjacent apertures are in alinement. When intermeshed under these circumstances, as shown in Figs. 1, 2 and 5, it will be noted that the engaging teeth 34 of each pair are forced equally and oppositely against opposed thread flanks on the worm 10 to effectively take up and eliminate any backlash which might normally exist due to clearance between the parts. This effect is clearly shown in Fig. 5 wherein attention is directed to the fact that the flank 74 of the lower gear 32, as viewed in the figure, is parallel with the adjacent face of the angularly extending tooth 30, while at the same time the flank 76 of the upper gear 32 contacts the flank of the adjacent tooth 30 in exactly the same angular relationship, both contacts being made under the influence of an equal and opposite reaction.

The present invention provides a simple and effective gear, as well as an expeditious and inexpensive method for forming the gear for use in intermeshing engagement with a second gear having a helical thread. While the above illustrated disclosure has been directed primarily to a combination of worm gear and worm wheel, it will be apparent to those skilled in the art that it is likewise adaptable to various other types of so-called helical or spiral gearing which may comprise central shafting arranged at various angles and relationships.

Numerous changes may be made in the form, construction and arrangement of the parts withous departing from the spirit of the invention or sacrificing any of its advantages, and the right is hereby reserved to make all such changes as fairly fall within the scope of the following claims.

The invention is hereby claimed as follows:

1. The method of providing a gear adapted to mesh in operative relationship with a second gear having a helically arranged tooth, which comprises providing a flat blank, subjecting the blank to the pressing action of a die to form gear tooth portions thereon, twisting each gear tooth with respect to the plane of the body portion of the gear, progressively between the root and crest portions thereof.

2. The method of providing a gear adapted to mesh in operative relationship with a second gear adapted to be positioned with respect thereto and having a helically arranged tooth, which comprises providing a flat blank, subjecting the blank to a pressing operation to form transversely extending gear teeth on the periphery thereof, twisting each gear tooth with respect to the plane of the body portion of the gear, progressively between the root and crest portions thereof.

3. The method of providing a gear adapted to mesh in predetermined operative relationship with a second gear having helically arranged teeth, which comprises providing a flat blank of material having gear teeth thereon extending transversely of said flat blank, twisting each gear tooth with respect to the plane of the body portion of the gear, progressively between the root and crest portions thereof.

4. The method of providing a gear adapted to mesh in predetermined operative relationship with a second gear having helically arranged teeth, which comprises providing a sheet blank of material, subjecting said sheet material to a stamping operation to form a substantially flat gear having generally transversely extending, radial gear teeth on the periphery thereof, and twisting each gear tooth with respect to the plane of the body portion of the gear, progressively between the root and crest portions thereof.

5. The method of providing a gear adapted to mesh in predetermined operative relationship with a worm gear having a helically arranged tooth, which comprises providing a blank of sheet material, subjecting said sheet material to a stamping operation to form a substantially flat gear having substantially radially extending gear teeth on the periphery thereof, said teeth being generally coextensive with the thickness of the sheet material, twisting each gear tooth with respect to the plane of the body portion of the gear, progressively between the root and crest portions thereof.

6. In combination, a helical gear having at least one gear tooth arranged in a substantially helical path on the periphery thereof, an intermeshing gear associated with the helical gear, said intermeshing gear having gear teeth formed on the periphery thereof and arranged generally transversely to the plane of the gear, said teeth being twisted with respect to the plane of the body portion of the gear in such a manner that each tooth twists progressively between the root and crest portion thereof.

7. In combination, a helical gear having at least one gear tooth arranged in a helical path on the periphery thereof, an intermeshing gear associated with the helical gear, said gears having fixed spaced axes, said intermeshing gear having gear teeth formed on the periphery thereof and arranged generally transversely to its plane, each tooth of said intermeshing gear being twisted with respect to the plane of the body portion of the gear in such a manner that each tooth twists progressively between the root and crest portion thereof.

8. In combination, a helical gear having at least one gear tooth arranged in a substantially helical path, an intermeshing gear having an axis spaced from the axis of said helical gear, said intermeshing gear being arranged in a plane intersecting said gear tooth of the helical gear and making an angle of less than 90 degrees with a line normal to the said gear tooth at the point of intersection, gear teeth formed on the periphery of said intermeshing gear and extending generally transversely to the plane of the gear, said teeth being twisted with respect to the plane of the body portion of the gear in such a manner that each tooth twists progressively between the root and crest portion thereof.

9. In combination, a helical gear having at least one gear tooth arranged in a substantially helical path, an intermeshing gear, said intermeshing gear being arranged in a plane intersecting said gear tooth of the helical gear and making an angle of less than 90 degrees with a line normal to the said gear tooth at the point of intersection, gear teeth formed on the periphery of said intermeshing gear and extending generally transversely to the plane of the gear, said teeth being twisted with respect to the plane of the body portion of the gear in such a manner that each tooth twists progressively between the root and crest portion thereof.

10. A gear having peripheral, generally radially extending gear teeth formed thereon and extending generally transversely to the plane of the gear, said teeth being progressively twisted about their radial axes in a direction extending from the root to the crest.

11. A gear having peripheral, generally radially extending gear teeth formed thereon and extending generally transversely to the plane of the gear, said teeth being progressively twisted about their radial axes in a direction extending from the root to the crest.

12. In combination, a gear, a pair of coaxially arranged gears intermeshing with said first named gear, means to prevent backlash between said gears, said backlash preventing means comprising apertures in said coaxial gears, one edge of each aperture being substantially in a curve formed about the axis of said coaxial gears as a center, and a bowed spring arranged in said apertures, the ends of said spring being bifurcated and oppositely engaging said edges to retain the spring in said position, each aperture having opposed side edges intersecting said first named edge against which the spring reacts to urge the gears oppositely whereby to cause the teeth of said coaxial gears to react relatively oppositely against the engaging tooth flanks of said first named gear.

13. A gear construction for use in a gear train to prevent backlash and comprising a pair of coaxially intermeshing gears, apertures in both of said coaxial gears, one edge of each aperture being substantially in a curve formed about the axis of said coaxial gears as a center, and a bowed spring arranged in both of said apertures, the ends of said spring slidably engaging said edges to retain the spring in said position, each aperture having a side edge intersecting said first named edge against which the spring reacts to urge the gears oppositely whereby to cause the teeth of said coaxial gears to react relatively oppositely against the engaging tooth flanks of an intermeshing gear.

14. A gear construction for use in a gear train to prevent backlash and comprising a pair of coaxially intermeshing gears, apertures in both of said coaxial gears, one edge of each aperture being substantially in a curve formed about the axis of said coaxial gears as a center, and a bowed spring arranged in both of said apertures, the ends of said spring slidably engaging said edges to retain the spring in said position, the intermediate portions of said spring being spaced from said edges, and means located a predetermined point on each of said first named edges against which the spring reacts to urge the gears oppositely whereby to cause the teeth of said coaxial gears to react relatively oppositely against the tooth flanks of an intermeshing gear.

ERHARD U. T. BERTHELSEN.